United States Patent
Forestelli

(10) Patent No.: US 7,779,674 B2
(45) Date of Patent: Aug. 24, 2010

(54) METHOD FOR TESTING BOTTLES OR CONTAINERS HAVING FLEXIBLE WALLS, AS WELL AS A PLANT IMPLEMENTING IT

(75) Inventor: Fabio Forestelli, Alseno Piacenza (IT)

(73) Assignee: FT System S.r.l., Alseno (Piacenza) (IT)

( * ) Notice: Subject to any disclaimer, the term of this patent is extended or adjusted under 35 U.S.C. 154(b) by 509 days.

(21) Appl. No.: 11/881,850

(22) Filed: Jul. 30, 2007

(65) Prior Publication Data

US 2008/0028876 A1 Feb. 7, 2008

(30) Foreign Application Priority Data

Aug. 1, 2006 (IT) .......................... PC2006A0033

(51) Int. Cl.
*G01M 3/02* (2006.01)
(52) U.S. Cl. ........................................................ 73/37
(58) Field of Classification Search .................. 73/37
See application file for complete search history.

(56) References Cited

U.S. PATENT DOCUMENTS

| 6,494,083 B1 | 12/2002 | Heuft |
| 6,872,895 B2 | 3/2005 | Cochran et al. |
| 6,894,775 B1 | 5/2005 | Cech |
| 6,967,716 B1 | 11/2005 | Cochran et al. |
| 2006/0283145 A1 | 12/2006 | Weisgerber et al. |

FOREIGN PATENT DOCUMENTS

| DE | 10001300 | 7/2001 |
| EP | 0503576 A1 | 3/1992 |
| EP | 0540853 A2 | 9/1992 |

OTHER PUBLICATIONS

European Search Report, May 25, 2007.

*Primary Examiner* — Hezron Williams
*Assistant Examiner* — Alex Devito
(74) *Attorney, Agent, or Firm* — Hedman & Costigan, P.C.; James V. Costigan

(57) ABSTRACT

The present invention has as its object a method for testing bottles or containers having flexible walls, made to be inserted in lines for filling bottles made from plastic material or aluminum containers or containers made from polyethylene-coated paperboard, containing any type of liquid. Positioned at the output of the filling system it is able to simultaneously check for the correct fill level, the presence of possible leaks in the sealing system of the container and possible constructive defects in the container. The test is carried out through the combination of two measurement systems, which are the fill level test and the measurement of the tension of the walls of the container. The results obtained from the level and wall tension measurements, suitably interpolated, provide the indicators necessary to establish whether the product being analyzed should be considered suitable or else to be discarded since it is defective.

5 Claims, 4 Drawing Sheets

METHOD FOR TESTING BOTTLES OR CONTAINERS HAVING FLEXIBLE WALLS, AS WELL AS A PLANT IMPLEMENTING IT

The present invention has as its object a method for testing bottles or containers having flexible walls, as well as a plant implementing it.

Such a method is applied in conventional and aseptic bottling plants and is able to inspect containers of different shapes and materials, provided that they are flexible in the walls.

Plants for testing bottles or containers having flexible walls are applied downstream of the lines for filling bottles or containers made from plastic material, like for example PET, HDPE, PE and so on, aluminium containers, like for example cans, or else containers made from polyethylene-coated paperboard (cartons), containing any type of liquid.

In particular, such plants are applied to the outlet of the filling plant, or possibly of the pasteurisation plant.

Plants for testing bottles or containers having flexible walls known up to now implement methods that carry out a test on the resistance exerted by the filled and hermetically closed container to an applied pressure.

The decision whether or not to dispose of a bottle or container is taken based upon constant and predetermined threshold values and based upon experience.

If the tension of the container is above the maximum threshold value, the method presumes that the container is filled excessively. However, the method is unable to detect whether the reason for the maximum threshold being exceeded is instead due to a rigidity of the container above the norm. In this second case, the container should not be discarded despite the fact that the measured tension exceeds the maximum threshold.

Moreover, in the case in which the detected tension is less than the minimum threshold value, the method is unable to distinguish between insufficient filling, the presence of leaks in the container or insufficient rigidity of the container.

Therefore, known methods have the drawback of often generating incorrect discards, i.e. discarded bottles or containers that are not defective so as to justify disposal.

The purpose of the present invention is to avoid the aforementioned drawbacks and in particular to make a method for testing bottles or containers having flexible walls that produces a minimum number of incorrect discards.

Another purpose of the present invention is to provide a method for testing bottles or containers having flexible walls that is able to distinguish between excessive filling of the container and high rigidity thereof.

A further purpose of the present invention is to make a method for testing bottles or containers having flexible walls that is able to distinguish between insufficient filling, the presence of leaks in the container and insufficient rigidity of the container.

The last but not least purpose of the present invention is to make a plant for testing bottles or containers having flexible walls for implementing the method according to the invention.

These and other purposes according to the present invention are accomplished by making a method for testing bottles or containers having flexible walls as outlined in claim 1.

Further characteristics of the method are the object of the dependent claims.

The characteristics and advantages of a method for testing bottles or containers having flexible walls according to the present invention shall become clearer from the following description, given as a non-limiting example, referring to the attached schematic drawings, in which.

With reference to the figures, a plant for testing bottles or containers having flexible walls is shown, wholly indicated with 10 and with 20 according to the embodiment.

Figure 1:
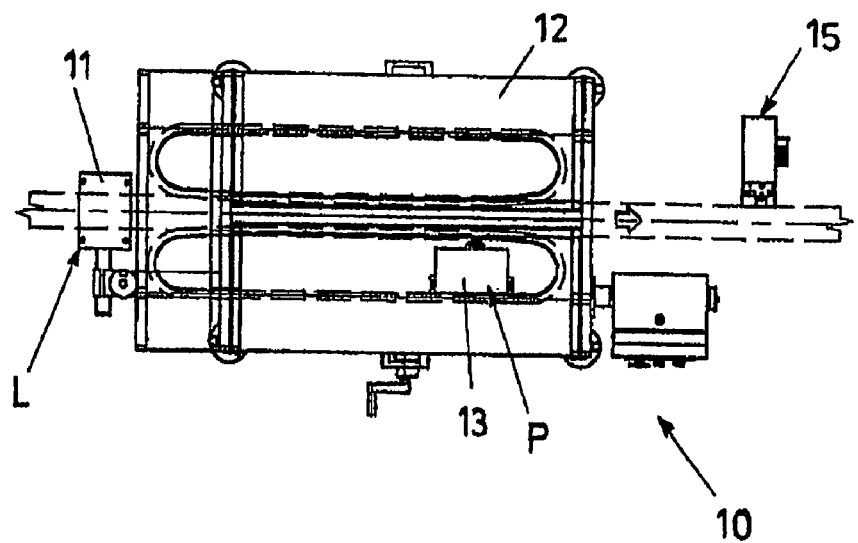
FIG. 1 is a view from above of a first embodiment of the plant implementing the method according to the present invention.

The plant 10, in the first configuration illustrated in FIG. 1, comprises a level control 11 installed at the machine input, bridging the production line and capable of measuring the fill level of the container without making any contact with it.

Downstream of the level control 11, a group of parallel motorised double belts 12 exerts a force on the side walls of the container, accompanying it for a certain portion.

A module 13 for measuring the pressure of the walls of the container is arranged in output from the group of belts 12.

Figure 2:
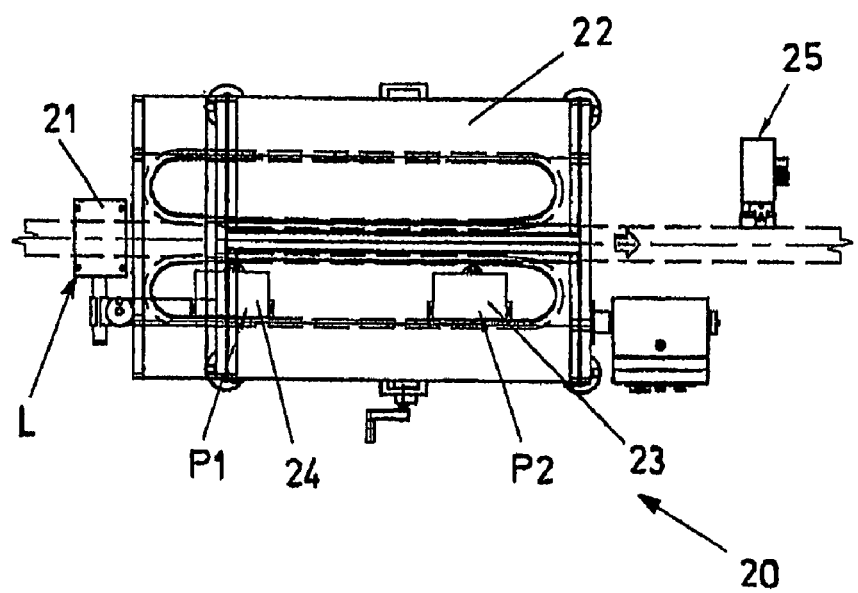
FIG. 2 is a view from above of a second embodiment of the plant implementing the method according to the present invention.
Figure 3:
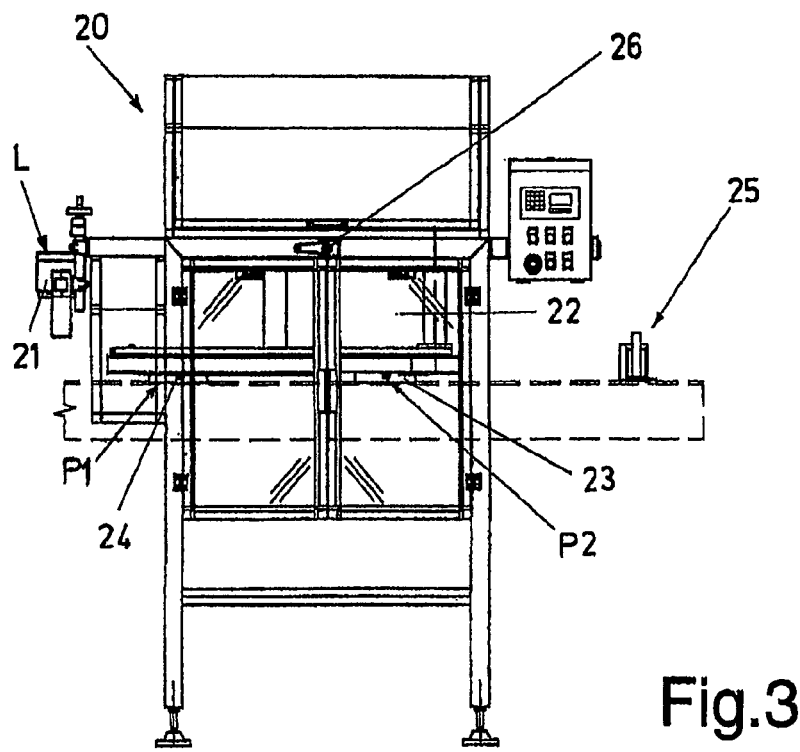
FIG. 3 is a top side view of the embodiment of FIG. 2.
Figure 4:
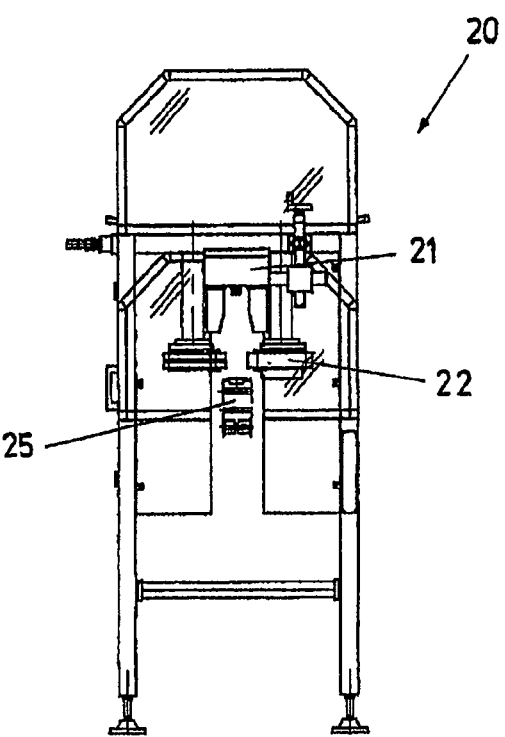
FIG. 4 is a front view of the embodiment of FIG. 2.
Figure 5:
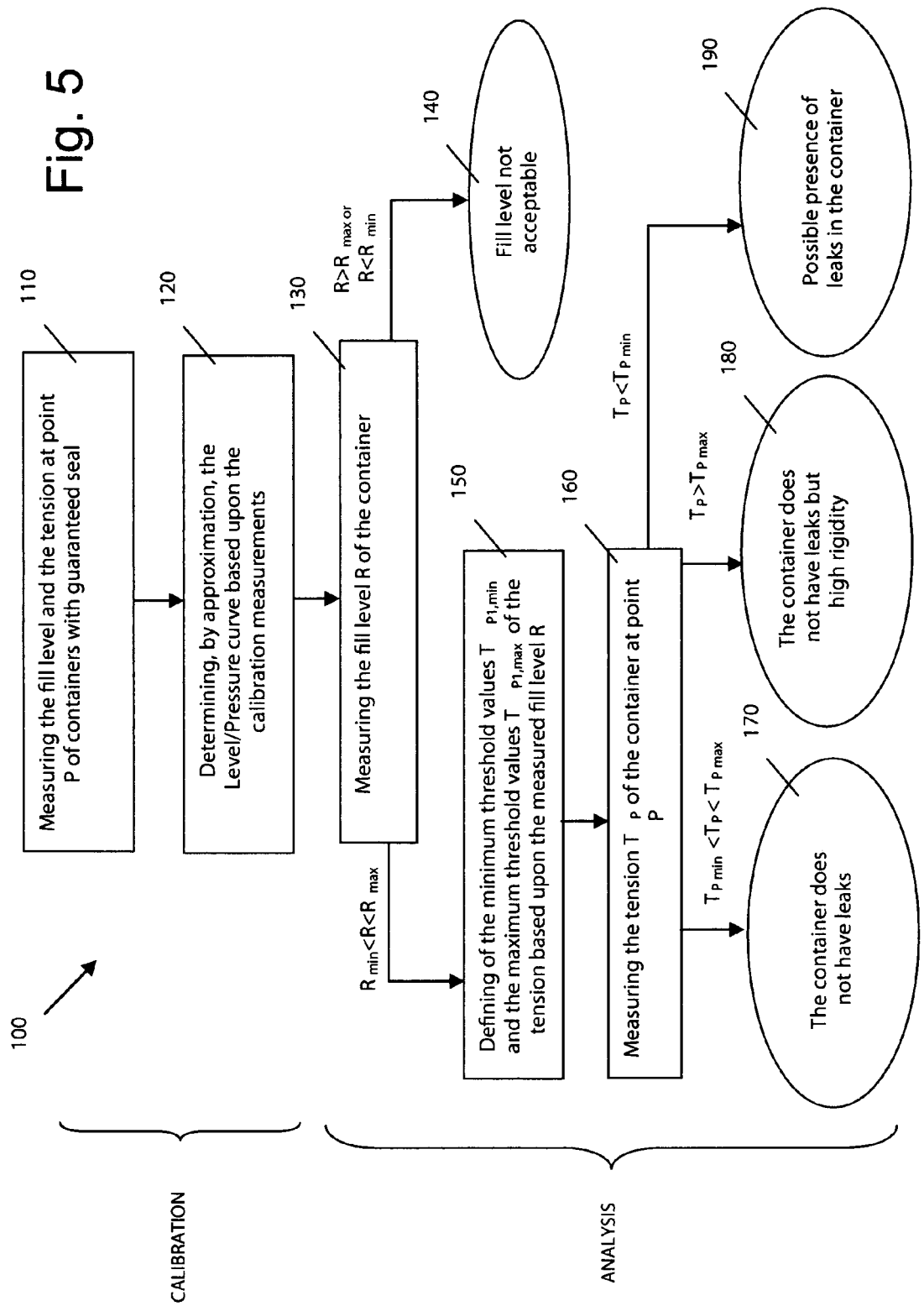
FIG. 5 is a block diagram of a first embodiment of the testing method according to the invention.
Figure 6:
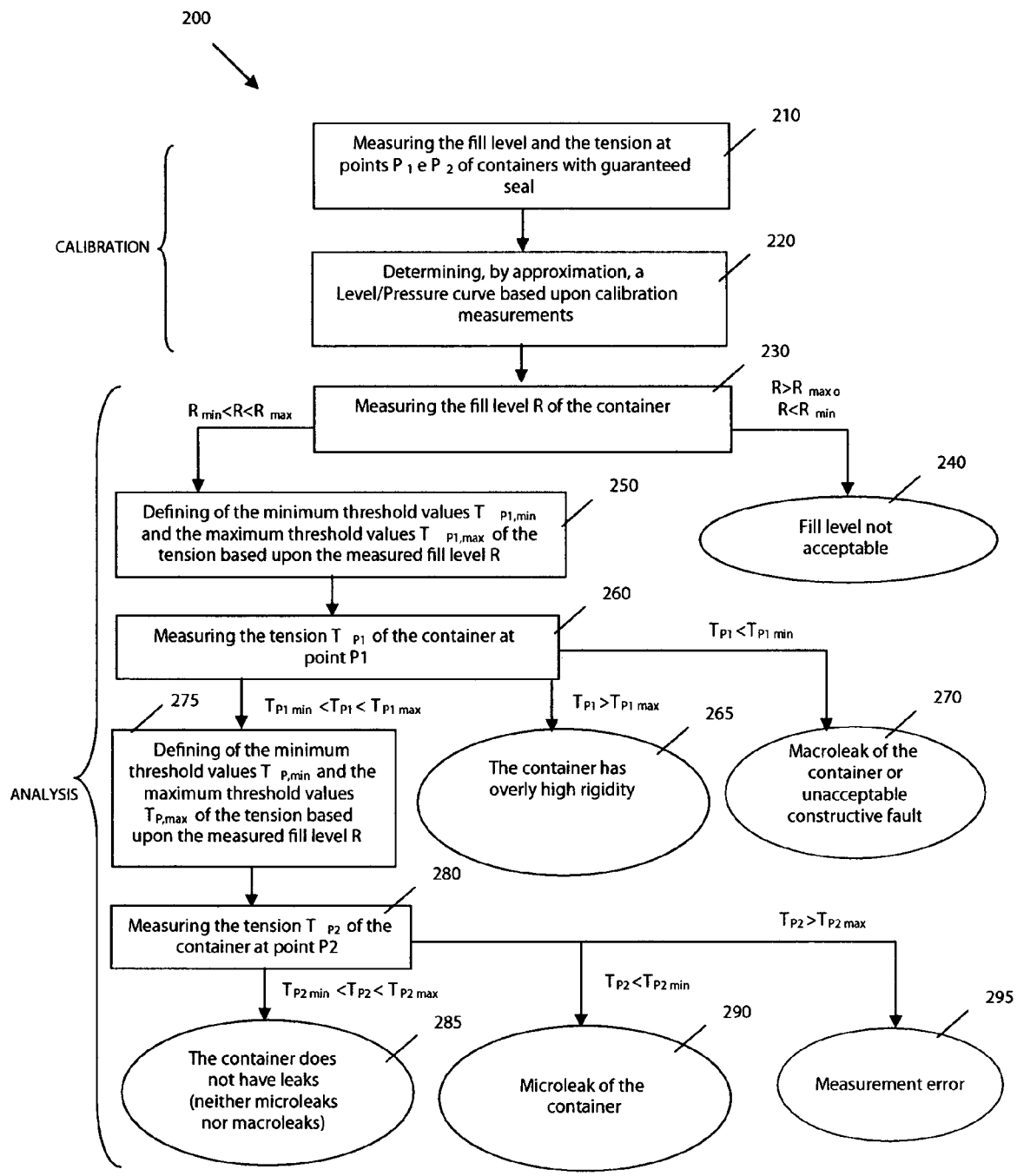
FIG. 6 is a block diagram of a second embodiment of the testing method according to the invention.

A second configuration of the plant 20, visible in FIGS. 2-4, consists of a level control 21 at the machine input and a group of belts 22 arranged downstream thereof. Along the portion in which the container is pressed by the group of belts 22, at the start and at the end respectively, two modules 23, 24 for measuring the tension of the side walls are foreseen.

The difference between the two embodiments of the testing plant 10, 20 depends upon the product to be inspected, i.e. for particularly flexible or deformable containers the adoption of the second configuration provided with two modules 23, 24 for measuring the tension of the walls, in addition to ensuring the seal of the container, also ensures that defects linked to the deformation of the bottle are detected.

Vice-versa, for containers in which, due to the way in which they are made or due to the material with which they are made, the possibility of deformation or alteration of shape can be considered negligible, the inspection can be carried out with the plant 10 in the first configuration comprising a single module 13 for measuring the tension of the walls.

In both configurations, in output from the machine there is an expulsion device 15, 25 intended to remove unsuitable products from the production line.

As an alternative to the expulsion device 15, 25 a signal can be supplied that in any case allows unsuitable products to be identified.

The overall testing plant 10 operates based upon the physical principle in which the liquid inside the container is uncompressible, whereas the layer of air between the fill level and the lid of the same container is compressible, since it is a gas.

By applying an external force to the side walls of the container, with the internal pressure remaining equal, it deforms according to the fill level.

According to the present invention, in order to carry out a correct measurement of the tension of the walls of the container, so as to test the seal of the container, a compensation factor deriving from the fill level itself has been introduced.

The module 11, 21 for checking the fill level can be made with various technologies, according to the container and the liquid to be tested, the speed of the production line and the precision required.

Normally, a high-frequency module or high-frequency capacitive module, generally used for all liquids for drinking.

The bottles pass through a measurement bridge made up of two metal plates that oscillate at a high frequency.

The plates are suitably connected to an electronic board dedicated to measuring the variation in frequency or capacity as the bottles pass. The variations are proportional to the amount of liquid.

The detected levels, suitably filtered and amplified, are processed by a processing unit, preferably with a microprocessor, in order to decide whether to accept or discard the sample being analysed.

Alternatively, it is possible to use an X-ray source generally used for all types of containers and liquids as module 11, 21 for testing the fill level.

Such an X-ray source is made up of a generator so as to emit a beam of rays able to penetrate the passing bottles and reach a reception sensor known as scintillator.

According to the amount of rays that hit the receiver, an electronic microprocessor unit is able to decide whether to accept or discard the sample being analysed.

It is also possible to use industrial television cameras as module 11, 21 for testing the fill level. The television camera linked to a suitable lighting system, takes a photo of all of the samples being analysed and image processing software calculates the fill level deciding whether to accept or discard the container.

The modules 13, 23, 24 for measuring the tension of the side walls can be made with a pressure transducer dedicated to measurements at P1 and possibly also at P2. Such a transducer can be implemented using different technologies such as linear, proximity, load cell, laser transducers, and so on.

The characteristics of the group of lateral belts 12, 22 necessary to impart a certain pressure to the walls of the container are sized based upon the following parameters:

height: direct function of the type of container (height and shape);

length: direct function of the maximum production speed, in which the higher the speed of the line, the greater the length must be to allow the correct detection of microleaks;

coating: foam made from various materials, like for example technopolymers, with thickness and hardness worked out according to the product to be tested (various types of plastic or metallic chain);

motorisation: single or double with speed adjustment according to the speed of transportation of the production line of the containers;

adjustment: the distance between the belts is adjusted through a suitable control wheel with numerator 26 that allows the pressure imparted upon the passing bottles to be increased or decreased based upon the type of container, lid and product to be tested.

The operation of the plant 10 in the configuration with a single module 13 for measuring the tension of the walls of the container (FIG. 1) shall be described hereafter.

The testing method 100 requires an initial calibration step 110, 120, in which it is necessary to have different suitable samples with guarantee of seal, filled to different levels within the range between the minimum fill level $R_{min}$ and the maximum acceptable level $R_{max}$.

Arranging the plant 10 in "Calibration" mode, it is necessary to pass the various samples through the plant, in order to store the following measurements:

measurement of the fill level R of the container at point "L";

measurement of the pressure at point P, indicating the tension of the walls of the container at that point.

The "Calibration" mode is aimed at calculating and storing the learnt calibration curve that relate the fill level with the pressure at points P1 and P2.

In other words for each sample, with a different fill level, but with a guaranteed seal, the tension value of the walls is learnt according to the fill level (step 110).

The electronic microprocessor unit in the plant 10 carries out the interpolation of the points found and reconstructs the Level/Pressure curve at the point of measurement P (step 120).

Once the "Calibration" step has finished the plant is put into "Analysis" mode.

By making a bottle pass in "Analysis" mode the testing plant carries out the first measurement step, detecting the fill level R and determines the first filling index (step 130).

If the filling index is outside of the threshold values set for the minimum $R_{min}$ or maximum $R_{max}$ level, the container shall be respectively ejected for the minimum $R_{min}$ or maximum $R_{max}$ level (step 140).

If the filling index is within the threshold values, one proceeds to the second analysis step.

The value of the measured level R, together with the calibration curve at P, are used by the algorithm for foreseeing the tension of the walls of the container at P to determine the range of values between $T_{P\ MIN}$ and $T_{P\ MAX}$, in which the range $T_{Pi}$ is the ideal value (step 150).

$T_{P\ MIN}$ is identified by the subtraction between $T_{Pi}$ and the minimum acceptable threshold tension at P, whereas $T_{P\ MAX}$ is given by the sum between $T_{Pi}$ and the maximum acceptable threshold tension at P.

By measuring the pressure $T_P$ at P (step 160), the value obtained, which is an index of the bottle pressure at P, can be within the foreseen range $[T_{P\ MIN}, T_{P\ MAX}]$ or else outside of it, i.e. there can be the two cases outlined below:

The measurement at P is within the foreseen range $[T_{P\ MIN}, T_{P\ MAX}]$, therefore it can be presumed that the container does not have leaks in the lid system or holes in the container itself (step 170);

The measurement at P is outside of the foreseen range $[T_{P\ MIN}, T_{P\ MAX}]$, in particular if above $T_{P\ MAX}$ (step 180) it indicates extreme rigidity of the container. Therefore, according to the set thresholds the container can be discarded. Or else if it is less than $T_{P\ MIN}$ (step 190), it indicates a possible leak in the lid system, the presence of a hole in the container or else an internal pressure that is lower than the sample. Also in this case, according to the set thresholds the container can be discarded.

Summing up, at the end of the measurement process, the plant according to the first embodiment is able to calculate two indices, respectively:

in a first analysis step, the fill level index R, calculated at L;

in a second analysis step, the leak detection or container deformation index, calculated at P.

Suitable lower threshold and upper threshold values are defined for each index, which are necessary to identify the container to be discarded or accepted.

The operation of the plant 20 in the configuration with double module 23, 24 for measuring the tension of the walls of the container (FIGS. 2-4) is the following.

The testing method 200 implemented by the plant 20 according to the second embodiment requires an initial calibration step 210, 220, in which it is necessary to have different suitable samples with guaranteed seal, filled to different level within the range between the minimum fill level $R_{min}$ and the maximum acceptable level $R_{max}$.

By arranging the plant 20 in "Calibration" mode it is necessary to pass the various samples through the plant 20, in order to store the following measurements:

measurement of the fill level R of the container at point "L";

measurement of the tension $T_{P1}$ of the walls of the container, at point P1;

measurement of the tension $T_{P2}$ of the walls of the container, at point P2.

The "Calibration" mode is intended to calculate and store the learnt calibration curves that relate the fill level and the pressure in points P1 and P2.

In other words for each sample, different in the fill level R, but with guaranteed seal, the tension value T of the walls is learnt according to the fill level (step 210).

The electronic microprocessor unit present on the plant 20 carries out the interpolation of the points found and reconstructs the Level/pressure curve in the two measurement points P1 and P2 (step 220).

Once the "Calibration" step has finished the plant is put into "Analysis" mode.

By making a bottle pass in "Analysis" mode the testing plant initially carries out the measurement of the fill level R and determines the first filling index (step 230).

If the filling index is outside of the threshold values set for the minimum $R_{min}$ or maximum $R_{max}$ level, the container shall be respectively ejected for the minimum $R_{min}$ or maximum $R_{max}$ level (step 240).

If the filling index is within the threshold values, one proceeds to the second analysis step, i.e. the value of the measured level R, together with the calibration curve at P1, are used by the algorithm for foreseeing the tension $T_{P1}$ of the walls of the container at P1.

In particular, this concerns the calculation of a range of values between $T_{P1\ MIN}$ and $T_{P1\ MAX}$, in which the range $T_{P1i}$ is the ideal value (step 250).

$T_{P1\ MIN}$ is identified by the subtraction between $T_{P1i}$ and the minimum acceptable threshold tension at P1, whereas $T_{P1\ MAX}$ is given by the sum between $T_{P1i}$ and the maximum acceptable threshold tension at P1.

By measuring the pressure $T_{P1}$ at P1 (step 260), the value obtained, which is an index of the bottle pressure at P1, can be within the foreseen range $[T_{P1\ MIN}, T_{P1\ MAX}]$ or else outside of it, i.e. there can be the two cases outlined below:

The measurement at P1 is within the foreseen range $[T_{P1\ MIN}, T_{P1\ MAX}]$, therefore it can be presumed that the container does not have alterations in shape or thickness of the material of the walls and also does not have microleaks, due for example to the lack of a lid or the partial welding of the seal;

The measurement at P1 is outside of the foreseen range $[T_{P1\ MIN}, T_{P1\ MAX}]$. In particular, if above $T_{P1\ MAX}$ (step 265) it indicates extreme rigidity of the container. Therefore, according to the set thresholds the container can be discarded. Or else if it is less than $T_{P1\ MIN}$ (step 270), it indicates an alteration in shape or thickness of the container or else a microleak. Also in this case, according to the set thresholds the container can be discarded.

Supposing that the measurement at P1 falls within the foreseen range $[T_{P1\ MIN}, T_{P1\ MAX}]$, the difference between the foreseen ideal value $T_{P1i}$ of the tension of the walls and the value actually measured $T_{P1}$ is calculated, i.e. $\Delta T_{P1}=T_{P1i}-T_{P1}$.

With the same methodology applied in the second step, the foreseen value $T_{P2i}$ of the tension of the walls of the bottle at P2 is calculated, using the measurement of the fill level R and the Level/Pressure calibration curve at P2 (step (275).

The foreseen index $T_{P2i}$ at P2 must be compensated according to the difference obtained at P1, i.e. $\Delta T_{P1}$, in this way obtaining the actual range of foreseen values of the tension of the walls at P2 between $T_{P2\ MIN}$ and $T_{P2\ MAX}$, within the range of which $T'_{P2i}=T_{P2i}-\Delta T_{P1}$ is the foreseen ideal value at P2.

At this point the testing method carries out the third analysis step acquiring the tension value of the walls at point P2 (step 280).

By measuring the pressure $T_{P2}$ at P2, the value obtained can thus be within the foreseen range $[T_{P2\ MIN}, T_{P2\ MAX}]$, or else outside of it, i.e. there can be the two cases outlined below:

The measurement at P2 is within the foreseen range $[T_{P2\ MIN}, T_{P2\ MAX}]$ (step 285), therefore it can be presumed that the container does not have microleaks, due for example to micro-holes in the lid or in the body of the bottle or in the seal, or else due to welding defects in the seal, and is thus suitable;

The measurement at P2 is outside of the foreseen range $[T_{P2\ MIN}, T_{P2\ MAX}]$, in particular, if below $T_{P2\ MIN}$ (step 290) it can be presumed that the container has microleaks, due for example to micro-holes in the lid or in the body of the bottle or in the seal, or else due to welding defects in the seal, for which reason according to the set thresholds the container can be discarded. On the other hand if it is over $T_{P2\ MAX}$ (step 295), there is probably a measurement error in one of the two detections at P1 and/or P2 of the tension of the walls of the container. Therefore, the container must be discarded for safety reasons.

Summing up, at the end of the measurement process, the method is able to calculate three indices, respectively:

during the first analysis step, the fill level index R, calculated at L;

during the second analysis step, the microleak identification or container deformation index, calculated at P1.

during the third analysis step, the microleak identification index, calculated at P2.

Suitable lower threshold and upper threshold values are defined for each index, which are necessary to identify the container to be discarded or accepted.

From the description that has been made the characteristics of the method and of the plant object of the present invention are clear, just as the relative advantages are also clear.

The method according to the invention is able to simultaneously check the correct fill level, the presence of possible leaks in the seal of the container and possible constructive defects in the container itself. For example, in the case of bottles made from PET, the plant according to the invention is able to detect defects linked to the non-uniform distribution or incorrect weighting of the material during the extrusion or blowing step of the bottle.

The innovation introduced consists of the measurement process adopted to identify leaks or to detect defects relative to the deformation of the container.

The method is innovative since, through the compensation of the measurements of the tension of the walls of the container according to the relative fill level, excellent results are obtained in terms of precision and repeatability on the calculation of the indicators for deciding the suitability of the container.

The indicators calculated in the measurement process offer the possibility of setting tolerance thresholds relative to the following defectiveness categories:

exceeding the maximum fill level or not reaching the minimum fill level;

detection of leaks in the closing system or in the walls or bottom of the container;

detection of a defect in the shape or thickness or deformation in the walls of the container.

Finally, it is clear that the method and the plant thus conceived can undergo numerous modifications and variations, all of which are covered by the invention; moreover, all of the details can be replaced by technically equivalent elements. In practice, the materials used, as well as the sizes, can be whatever according to the technical requirements.

The invention claimed is:

1. Method for testing bottles or containers having flexible walls comprising the steps of: a) determining at least one Level/Pressure calibration curve at at least one measurement point (P, P1, P2) based upon measurements carried out on a plurality of sealed sample bottles or sealed containers; b) measuring (130, 230) the fill level (R) of a bottle or container; c) rejecting (140, 240) the bottle or container in the case in which the measured fill level (R) is outside of a predetermined range (Rmin, Rmax) of fill levels; d) determining (150, 250) a range ((Tp min, Tp max), (Tpl min, Tp max)) of acceptable pressures in a first (P, P1) of said at least one measurement point, based upon the corresponding calibration curve constructed at step a) and based upon the fill level (R) measured at step b), in the case in which the measured value is within said predetermined range (Rmin, Rmax) of fill levels; e) measuring (160, 260) the pressure (Tp, Tp1) of said bottle or container at said first measurement point (P,P1); f) discarding (180, 190, 265, 270) said bottle or container, if the pressure (Tp, Tp1) measured at step e) is outside of the range of pressures ((Tp min, Tp max), (Tpl min, TP max)) determined at step d); g) keeping (170) said bottle or container, if the pressure (Tp, Tp1) measured at step e) is within the range of pressures ((Tp min, Tp max), (Tpl min, TP max)) determined at step d).

2. Method for testing bottles or containers having flexible walls according to claim 1 and comprising the additional steps of:
h) determining (275) a range of acceptable pressures ([$T_{P2\ MIN}$, $T_{P2\ MAX}$]) in a second (P2) of said at least one measurement point, based upon the corresponding calibration curve constructed at step a) and based upon the pressure ($T_P$, $T_P1$) of said bottle or container at said first measurement point (P, P1) measured at step e), if said bottle or container is kept at step g);
i) measuring (280) the pressure ($T_{P2}$) of said bottle or container at said second measurement point (P2); l) discarding (290, 295) said bottle or container, if the pressure ($T_{P2}$) measured at step i) is outside of the range of pressures ([$T_{P2\ MIN}$, $T_{P2\ MAX}$]) determined at step h); m) keeping (285) said bottle or container, if the pressure ($T_{P2}$) measured at step i) is within the range of pressures ([$T_{P2\ MIN}$, $T_{P2\ MAX}$]) determined at step h).

3. Method for testing bottles or containers having flexible walls according to claim 1, wherein said step a) of constructing the calibration curve consists of: A1) measuring (110, 210) the fill value and the tension value of the walls at at least one measurement point (P, P1, P2) of a plurality of sealed sample bottles or sealed containers; and a2) determining a Level/Pressure calibration curve at said at least one measurement point (P, P1, P2) based upon measurements carried out at step a1).

4. Method for testing bottles or containers having flexible walls according to claim 1, wherein said step d) of determining a range ([$T_{P\ MIN}$, $T_{P\ MAX}$], [$T_{1\ MIN}$, $T_{P1\ MAX}$]) of acceptable pressures in a first (P, P1) measurement point consists of: d1) determining a first ideal pressure value ($T_{Pi}$, $T_P1_i$) relative to said first measurement point (P, P1) inserting the fill level (R) measured at step b) into the corresponding calibration curve determined at step a); d2) identifying a first minimum pressure value ($T_{P\ MIN}$, $T_{P1\ MIN}$) by subtracting a first minimum acceptable threshold tension at said first measurement point (P, P1) from said first ideal pressure value ($T_{Pi}$, $T_P1i$); and d3) identifying a first maximum pressure value ($T_{P\ MAX}$, $T_{P1\ MAX}$) by adding a first maximum acceptable threshold tension at said first measurement point (P, P1) to said first ideal pressure value ($T_Pi$, $T_P1i$).

5. Method for testing bottles or containers having flexible walls according to claim 2, wherein said step h) of determining a range of acceptable pressures ([$T_{P2\ MIN}$, $T_{P2\ MAX}$]) in a second measurement point (P2) consists of: h1) determining a second ideal pressure value ($T_{P2i}$) relative to said second measurement point (P2) inserting the fill level (R) measured at step b) into the corresponding calibration curve determined at step a);

h2) determining a compensated ideal pressure value ($T'_{P2i}$) relative to said second measurement point (P2), by subtracting the difference between said first ideal pressure value ($T_Pi$, $T_{P1i}$) and the pressure ($T_P$, $T_P1$) measured at said first measurement point (P, P1) from said second ideal pressure value ($T_{P2i}$);

h3) identifying a second minimum pressure value ($T_{P2\ MIN}$) by subtracting a second minimum acceptable threshold tension at said second measurement point (P2) from said second compensated ideal pressure value ($T'_{P2i}$); h4) identifying a second maximum pressure value ($T_{P2\ MAX}$) by adding a second maximum acceptable threshold tension at said second measurement point (P2) to said second compensated ideal pressure value ($T'_{P2i}$)).

* * * * *